United States Patent
Pecen et al.

(10) Patent No.: US 6,487,184 B1
(45) Date of Patent: Nov. 26, 2002

(54) METHOD AND APPARATUS FOR SUPPORTING RADIO ACKNOWLEDGEMENT INFORMATION FOR A UNI-DIRECTIONAL USER DATA CHANNEL

(75) Inventors: Mark E. Pecen, Rolling Meadows, IL (US); Niels Peter Skov Andersen, Roskilde (DK); Marcia Otting, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/649,105

(22) Filed: Aug. 25, 2000

(51) Int. Cl.$^7$ ................................................. H04Q 7/00
(52) U.S. Cl. ..................... 370/329; 370/524; 370/437; 370/469; 455/466
(58) Field of Search ................................. 370/328, 329, 370/330, 335–338, 348, 524, 443, 469; 455/452, 466, 511, 509, 516, 517, 450, 455, 88 R

(56) References Cited

U.S. PATENT DOCUMENTS

| | | | | |
|---|---|---|---|---|
| 5,526,401 A | * | 6/1996 | Roach, Jr. et al. | 455/426 |
| 5,878,351 A | * | 3/1999 | Alanara et al. | 455/466 |
| 6,064,889 A | * | 5/2000 | Fehnel | 455/511 |
| 6,122,503 A | * | 9/2000 | Daly | 455/419 |
| 6,317,435 B1 | * | 11/2001 | Tiedemann et al. | 370/441 |

OTHER PUBLICATIONS

"Digital cellular telecommunications system (Phase 2+); General Packet Radio Service (GPRS); Service Description; Stage 1", (European Telecommunications Standards Institute (ETSI), European Standard (Telecommunications series).

"Digital cellular telecommunications system (Phase 2+); General Packet Radio Service (GPRS); Service Description; Stage 2", (European Telecommunications Standards Institute (ETSI), European Standard (Telecommunications series).

"$3^{rd}$ Generation Partnership Project (3GPP); Technical Specification Group Core Network (TSG CN); Universal Mobile Telecommunications System (UMTS); Mobile radio interface layer 3 specification, Core Network Protocols—Stage 3", ($3^{rd}$ Generation Partnership Project; Telecommunications Standard).

"Digital cellular telecommunications system (Phase 2+); Mobile station—base station system (MS–BSS) interface; channel structures and access capabilities", (European Telecommunicaitons Standards Institute (ETSI), European Standard (Telecommunications series).

(List continued on next page.)

Primary Examiner—Seema S. Rao
(74) Attorney, Agent, or Firm—Matthew C. Loppnow

(57) ABSTRACT

A radiotelephone device receiving network information, transmitted along a radio channel, from a network includes an acknowledgement coordination module determining a mode for exchange of acknowledgement information with the network. The radiotelephone device transmits the acknowledgement information to the network through a main dedicated control channel, using a defined service access point identifier corresponding to transmission of the acknowledgement information through the main dedicated control channel, in response to the mode for exchange of acknowledgement information being the main dedicated control channel. The radiotelephone device transmits the acknowledgement information to the network using a temporary block flow acknowledgement interchange in response to the mode for exchange of acknowledgement information being other than the main dedicated control channel.

17 Claims, 4 Drawing Sheets

OTHER PUBLICATIONS

"Digital cellular telecommunications system (Phase 2+); General Packet Radio Service (GPRS); Multiplexing and multiple access on the radio path", (European Telecommunications Standards Institute (ETSI), European Standard (Telecommunications series).

"Digital cellular telecommunications system (Phase 2+); General Packet Radio Service (GPRS); Mobile station (MS)—Base Station System (BSS) interface; Radio Link Control/Medium Access Control (RLC/MAC) protocol", (European Telecommunications Standards Institute, (ETSI), Global System for Mobile Communications (GSM) specifications).

"Digital cellular telecommunications system (Phase 2+); Mobile radio interface layer 3 specification; Radio Resource Control Protocol", (European Telecommunications Standards Institute, (ETSI) Global System for Mobile Communications (GSM) specifications).

"Digital cellular telecommunications system (Phase 2+); Physical layer on the radio path", (European Telecommunications Standards Institute, (ETSI) Global System for Mobile Communications (GSM) specifications).

* cited by examiner

FIG.1 — PRIOR ART —

METHOD AND APPARATUS FOR SUPPORTING RADIO ACKNOWLEDGEMENT INFORMATION FOR A UNI-DIRECTIONAL USER DATA CHANNEL

FIELD OF THE INVENTION

The present invention relates generally to cellular packet data networks, and in particular, the present invention relates to a method and apparatus for exchanging acknowledgement information between a mobile station and a network in a cellular packet data network.

BACKGROUND OF THE INVENTION

The Global System for Mobile Communications (GSM) General Packet Radio Service (GPRS) and Enhanced Data for Global Evolution (EDGE) is intended to enable a service subscriber to send and receive data in an end-to-end packet transfer mode without utilization of network resources in the circuit-switched mode. GPRS, EDGE and 3rd Generation (3G) packet radio services permit the efficient use of radio and network resources when data transmission characteristics are i) packet based, ii) intermittent and non-periodic, iii) possibly frequent, with small transfers of data, e.g. less than 500 octets, or iv) possibly infrequent, with large transfers of data, e.g. more than several hundred kilobytes. User applications may include Internet browsers, electronic mail and so on. GPRS/EDGE radio access network (GERAN) is the real-time migration path for GPRS/EDGE into 3rd generation wireless.

It is generally assumed that most internet application data traffic is generally biased in the downlink direction, meaning that a majority of application data traffic is transmitted from the network to a user application. This assumption is based both on the expected behavior of the user, since most users engage in applications that require the reception of much larger amounts of information from the network relative to the amount of information required to be transmitted to the network, and on the inherent properties of many of the applications themselves. For example, accessing a page of information on the worldwide web (WWW) requires a very short transmission of an address sequence on the uplink, i.e., from the user application to the network, followed by the reception of data on the downlink, i.e., from the network to the user application, which may be several orders of magnitude larger than the transmission that caused the downlink transfer. Therefore, known packet-based systems have been constructed to support a greater flow of information in the downlink direction, and to segregate the allocation of uplink and downlink resources from one another. This construction of packet-based systems differs, for example, from the construction of circuit-switched methods, which tend to be constructed as a bi-directional virtual circuit allocating dedicated resources which may be used only occasionally throughout the life of the session.

FIG. 1 (Prior Art) is a flow diagram of unidirectional information flow over a radio channel from a network to a user application. In spite of the fact that downlink internet data appears to flow in a single direction much of the time, there is the additional requirement to maintain the integrity of the information as it crosses the radio fading channel in a wireless domain. One of the primary known mechanisms for protecting data integrity over the fading channel involves the concept of acknowledged network protocols. For example, in a GSM/3G radio environment in which a unidirectional packet data transfer is required, it is almost always the case, unless the transfer involves embedded voice or video, that network level acknowledgements from the user application are required in order to preserve the integrity of information across the fading channel in the presence of deep fades.

As illustrated in FIG. 1, a network 100 begins a setup sequence in a downlink setup period by sending a packet paging request 102 along a radio channel to a mobile station 104. Once a random access burst 106 is received from mobile station 104, network 100 sends an immediate assignment message 108 and a packet downlink assignment message 110, detailing the parameters of the assignment, such as over what channel the transfer would take place, when the transfer would start, and so forth. Prior to transmission by network 100, the information intended to be transferred to mobile station 104 is divided into packets, so that after receiving a packet control acknowledge message 112 from mobile station 104 indicating acknowledgement by mobile station 104 of the parameters of the assignment detailed in immediate assignment message 108 and packet downlink assignment message 110, network 100 sends a series of data blocks, or frames 114, containing the packets to mobile station 104.

Upon receiving frames 114, mobile station 104 sets up a temporary block flow 116 to transmit an acknowledgement message to the network 100. As illustrated in FIG. 1, during setup of temporary block flow 116, mobile station 104 transmits a channel request access burst 118 to network 100, which responds by transmitting an immediate assignment message 120. Mobile station 104 then transmits a packet resource request message 122 to network 100 requesting resources for the temporary block flow. Network 100 responds by transmitting a packet uplink assignment message 124 to mobile station 104, and mobile station 104 acknowledges receipt of packet uplink assignment message 124 by transmitting a packet control acknowledgement message 126 to network 100.

Once packet control acknowledgement message 126 has been transmitted, mobile station 104 transmits an acknowledgement message 128 that indicates which frames of frames 114 were received by mobile station 104, along with a request for re-transmission of the frames that were not received. For example, as illustrated in FIG. 1, as a result of the radio fading channel, mobile station 104 may have only received frame zero and frame three of frame zero through frame three that were sent from network 100. Therefore, network acknowledgement message 128 would indicate that frame zero and frame three where received, and would request re-transmission of frame one and frame two. Frame one and frame two would then be re-transmitted by network 100 to mobile station 104, which, assuming no effects from the radio fading channel, are subsequently received by mobile station 104. If network 100 is in a ready state upon receiving network acknowledgement message 128, the setup for re-transmission would not be required. However, if network 100 is not in a ready state, the setup would have to be repeated, requiring the use of even more resources.

Upon receiving frame one and frame two, mobile station 104 again sets up a temporary block flow 130 to transmit an acknowledgement message 132 to the network 100 by sending a channel request access burst 134 to network 100, which responds by sending an immediate assignment message 136. Mobile station 104 then sends a packet resource request message 138 to network 100 requesting resources for the temporary block flow. Network 100 responds by sending a packet uplink assignment message 140 to mobile station 104, and mobile station 104 acknowledges receipt of packet uplink assignment message 140 by sending network 100 a packet control acknowledgement message 142. Once packet control acknowledgement message 142 has been sent, mobile station 104 transmits network acknowledgement message 132 containing an indication that frame one and frame two were received.

The use of such network acknowledgements is problematic in that within current specifications for GPRS/EDGE and 3G packet data services, the setup of the logical channel over which radio link acknowledgments are sent requires a substantial amount of time and coordination by the network. Furthermore, the allocation of radio resources for such radio-level acknowledgments generally impacts the system capacity, and there may be cases when there are radio resources in one direction but not in the other direction for a full allocation, causing radio link control timers to expire and a flurry of unnecessary re-transmission queries to be made.

Accordingly, what is needed is an improved method and apparatus for exchanging acknowledgement information between a user application and a network.

BRIEF DESCRIPTION OF THE PREFERRED EMBODIMENT

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify like elements, and wherein:

DETAILED DESCRIPTION OF THE PREFERRED EMBODIMENT

The present invention makes use of the GSM and 3G concept of a "main dedicated control channel" (DCCH), over which signaling information is sent. The main DCCH may comprise different underlying basic physical channels depending upon in what mode the mobile station operates at a given point in time, and is viewed as a "logical virtual circuit". According to the present invention, the main DCCH is utilized for the exchange of radio link acknowledgment information in the opposite direction when i) a unidirectional data transfer is performed and ii) the conventional radio resources in the opposite direction are unavailable. Acknowledgment information arriving at an acknowledgment coordination module would be transported either over the main DCCH via a special service access point identifier (SAPI) or over the conventional medium access control (MAC) mechanism. The determination of which mode to utilize is made by the network, by transmitting an indication of the mode. Such a transmission is made, for example, in the request for acknowledgment information, which is transmitted from the network to the mobile station. This indication is necessary, because under normal conditions, the mobile station is not allowed to utilize the main DCCH for transmission using the special SAPI, unless the network has granted such usage. Furthermore, the network may not be equipped to utilize the special SAPI for such acknowledgments.

The request for acknowledgment contains an indication of the mode for exchange of acknowledgment information, as well as the standard information requesting an acknowledgment. If the request does not indicate a mode, the request is interpreted by the receiving entity as a request for the standard acknowledgment means using conventional resources.

Figure 1:
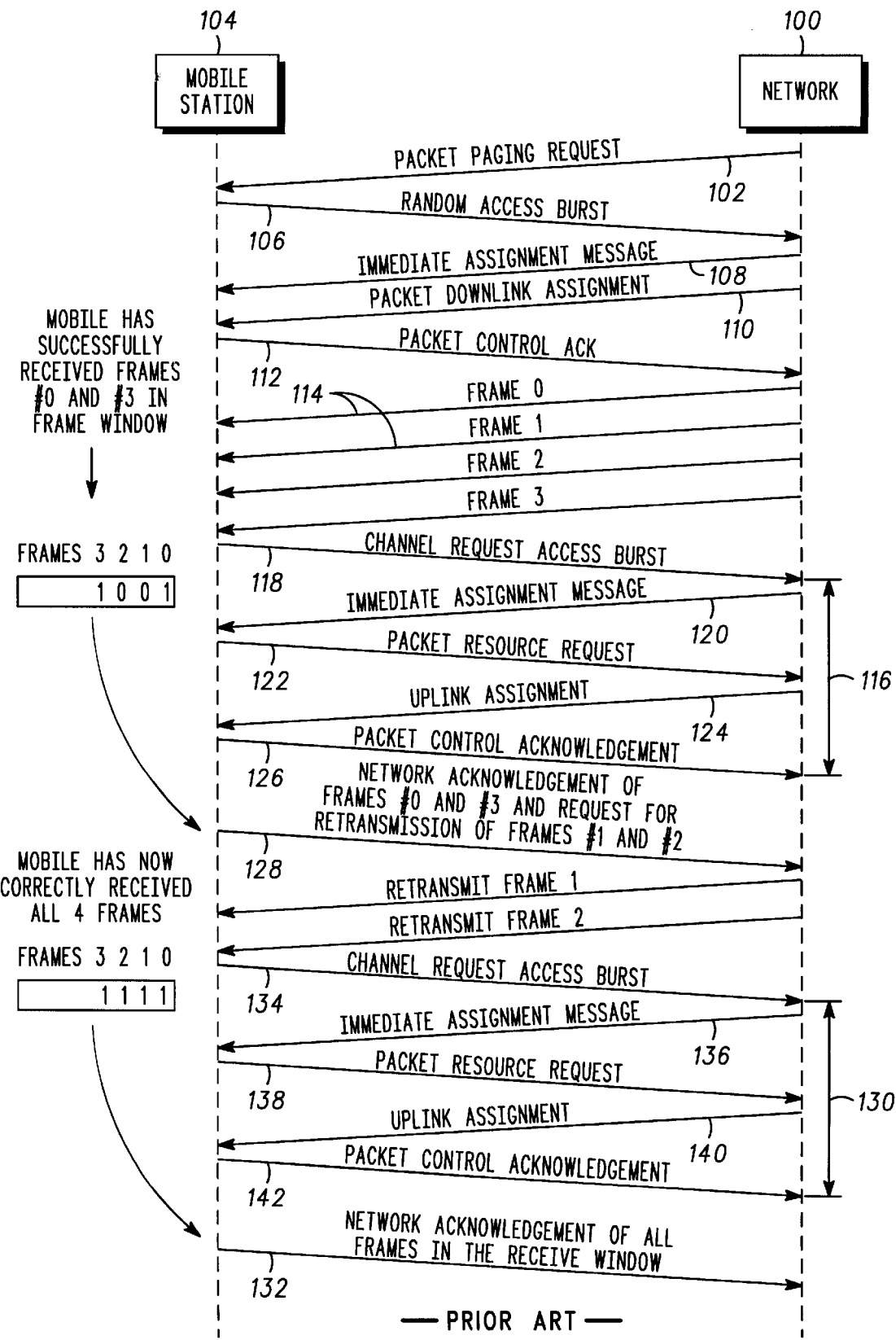
FIG. 1 (Prior Art) is a flow diagram of unidirectional information flow over a radio channel from a network to a user application.
Figure 2:
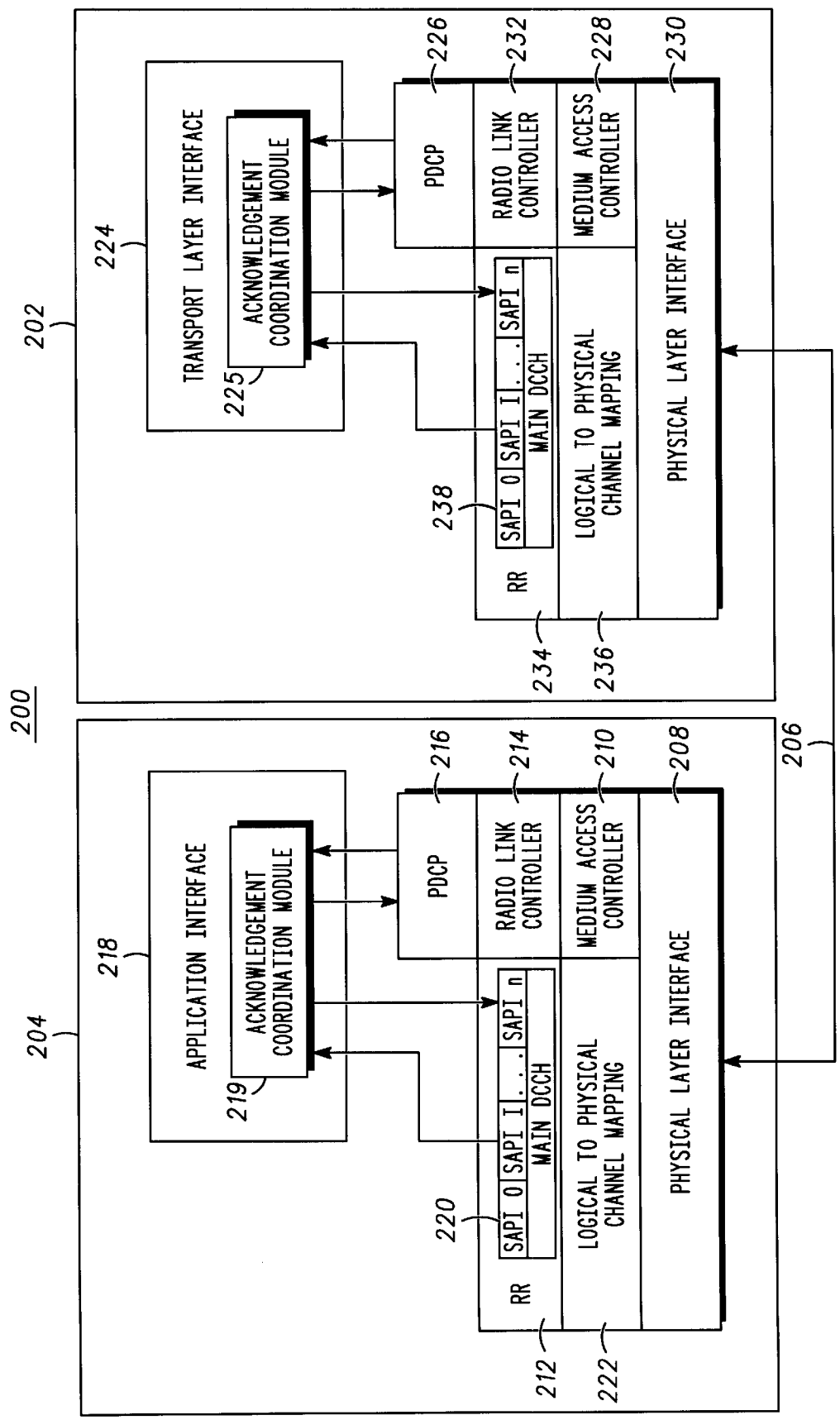
FIG. 2 is a schematic diagram of a data transfer architecture of a communication system, according to the present invention.

FIG. 2 is a schematic diagram of a data transfer architecture of a communication system, according to the present invention. As illustrated in FIG. 2, a communication system 200, such as a cellular packet data network, includes a network 202, transmitting user information to a mobile station 204 along a radio channel 206. In particular, according to the present invention, network 202 is, for example, a GPRS/EDGE radio access network (GERAN).

According to the present invention, mobile station 204 includes a physical layer unit 208 that provides interface between radio frequency hardware and a call processor (not shown), including scheduling of reception and transmission of physical data, receiver gain control, transmitter power control, signal level measurements, and so forth. A medium access controller 210 organizes the transmission and reception of packet-based information onto and from the physical layer interface 208, primarily including logic by which the mobile station 204 is informed of it's right to transmit at a given point. Medium access controller 210 is also responsible for the recognition of messages addressed to mobile station 204 on the downlink side.

A radio resource controller 212 controls the mobile station 204 with regard to network-oriented signaling pertaining to the radio messages, i.e., timeslot assignments, packet data channel setups/teardowns, RF channel assignments, and so forth, in addition to passing messages originating from the network via physical layer interface 208. A radio link controller 214 is primarily involved with error correction at the radio layer, i.e., to absorb the periodic errors which result from the fading channel, and also handles certain aspects of GPRS/EDGE data transfer setup and teardown. In this way, radio link controller 214 maintains the integrity of the radio link through acknowledgements and re-transmissions.

A packet data convergence protocol unit 216 packetizes/divides network protocol packet data into radio packets for transmission along radio channel 206, and provides compression and encryption services. Conversely, packet data convergence protocol unit 216 unpacketizes/divides radio packets received by mobile station 204 to the network protocol packet data for transfer to an application interface 218 of mobile station 204. Application interface 218 transfers the network protocol data from packet data convergence protocol unit 216 to a corresponding application within mobile station 204.

In this way, user or traffic data is transferred between application interface 218 and physical layer interface 208 through packet data convergence protocol unit 216, radio link controller 214, radio resource controller 212, and medium access controller 210. On the other hand, message transfers between network 202 and mobile station 204 that involve transfer of data other than user data, such as transfer of control data during call setup between network 202 and base station 204, are transmitted using a main dedicated control channel controller 220. A special service access point identifier (SAPI) is defined to identify each of the different non-user data message transfers to allow the multiplexing of those transfers. A logical to physical channel mapping controller 222 links the non-traffic messages between physical layer interface 208 and main dedicated control channel controller 220.

According to the present invention, network protocol packets corresponding to user data transmissions from network 202 to mobile station 204 are transferred by a transport layer interface 224 of network 202 to a packet data convergence protocol unit 226 which packetizes/divides the network protocol packets into radio packets. Network protocol packets are network packets containing network information and which utilize a network protocol, such as the known Transmission Control Protocol (TCP).

An acknowledgement coordination module 225 transmits an acknowledgement exchange message with the network protocol packets, as will be described below, indicating the mode for exchange of acknowledgement information. For example, according to the present invention, network 100 indicates either a temporary block flow acknowledgement interchange, or a main DCCH interchange as the mode for exchange of acknowledgement information.

According to the present invention, the determination by acknowledgement coordination module 225 of which mode is to be indicated by network 202 for exchange of acknowledgement information can be determined by any number of factors, such as radio resource availability and network congestion, for example. In addition, while acknowledgement coordination module 225 is shown in FIG. 2 as being located within transport interface layer 224, it is understood that, according to the present invention, acknowledgement coordination module 225 is not limited to being positioned within transfer layer interface 224, but may be located at other locations within network 202.

A medium access controller 228 recognizes messages addressed to mobile station 204, and organizes transfer of the radio protocol packets onto a physical layer interface 230 for transmission along radio channel 206 to mobile station 204. Once the radio packets are received by physical layer interface 208 of mobile station 204, medium access controller 210 recognizes the radio packets as user data and transmits the radio packets to radio link controller 214, which assembles a packet data control frame including an indication of data blocks received. Packet data convergence protocol unit 216 converts the radio packets to the network protocol packets and transfers the network protocol packets to application interface 218. The acknowledgement exchange message from network 202 is recognized by an acknowledgment coordination module 219 of mobile station 202, and based on this acknowledgement exchange message, mobile station 202 transmits an acknowledgement of receipt of the network protocol packet to network 202 using the mode indicated in the acknowledgement exchange message, as will be described below.

For example, according to the present invention, if the mode for exchange of acknowledgement information indicated by acknowledgement coordination module 225 is determined by acknowledgement coordination module 219 to be the utilization of a temporary block flow acknowledgement interchange, mobile station 204 transfers network protocol packets containing the acknowledgment information, including the indication of data blocks received, to packet data convergence protocol unit 216. Packet data convergence protocol unit 216 packetizes/divides the network protocol packets to corresponding radio protocol packets. Medium access controller 210 then organizes the transmission of the radio protocol packets onto physical layer interface 208 for transmission along radio channel 206 to network 202.

While acknowledgement coordination module 219 is shown in FIG. 2 as being positioned within application interface 218, it is understood that, according to the present invention, acknowledgement coordination module 219 is not limited to being positioned within application interface 218, but may be located at other locations within mobile station 204.

Once the radio protocol packets from mobile station 204 are received by physical layer interface 230, medium access controller 228 of network 202 recognizes the radio protocol packets as user data and transfers the radio protocol packets to a radio link controller 232. Radio link controller 232 recognizes which data blocks from the original transmission, if any, were indicated as not being received by radio link controller 214 of mobile station 204, and packet data convergence protocol unit 226 converts the radio protocol packets to network protocol packets, which are transferred to transport layer interface 224. If data blocks are indicated as not being received by mobile station 204, those data blocks are re-transferred along radio channel 206 from network 202 to mobile station 204 through packet data convergence protocol units 226 and 216, radio link controllers 232 and 214, medium access controllers 228 and 210 and physical layer interfaces 230 and 208 in the same way as described above.

On the other hand, according to the present invention, if the mode for exchange of acknowledgement information indicated by acknowledgement coordination module 225 of network 202 is a dedicated control channel acknowledgement interchange, mobile station 204 transfers the acknowledgement information, including the indication of data blocks received, to network 202 along a main dedicated control channel 220 of radio resource controller 212. In particular, as illustrated in FIG. 2, if acknowledgement coordination module 219 determines that the mode indicated in the network protocol packet from packet data convergence protocol unit 216 is the main dedicated control channel, application interface 218 transfers the acknowledgement information, including the indication of the data blocks received, to a defined service access point identifier of service access point identifiers SAPI 0 to SAPI n that corresponds to acknowledgement information, enabling transmission of the acknowledgement information through main dedicated control channel 220 of radio resource controller 212. Logical to physical mapping unit 222 maps the transmission from main dedicated control channel 220 to physical layer interface 208, and medium access controller 210 controls the transfer of the acknowledgement information from main dedicated control channel 220 to physical layer interface 208 for transmission along to radio channel 206.

Once the acknowledgement information is received by physical layer interface 230 of network, medium access controller 228 recognizes the acknowledgement information as control information, and maps the acknowledgement information to a main dedicated control channel 232 of a radio resource layer 234 through a logical to physical channel mapping unit 236 of network 202 that maps acknowledgement information according to the defined service access point indicator. The acknowledgement information is then transmitted to transport layer interface 224 via the defined service access point identifier. If data blocks are indicated as not being received by mobile station 204, those data blocks are re-transferred along radio channel from network 202 to mobile station 204 through packet data convergence protocol units 226 and 216, radio link controllers 232 and 214, medium access controllers 228 and 210 and physical layer interfaces 230 and 208 in the same way as described above.

Figure 3:
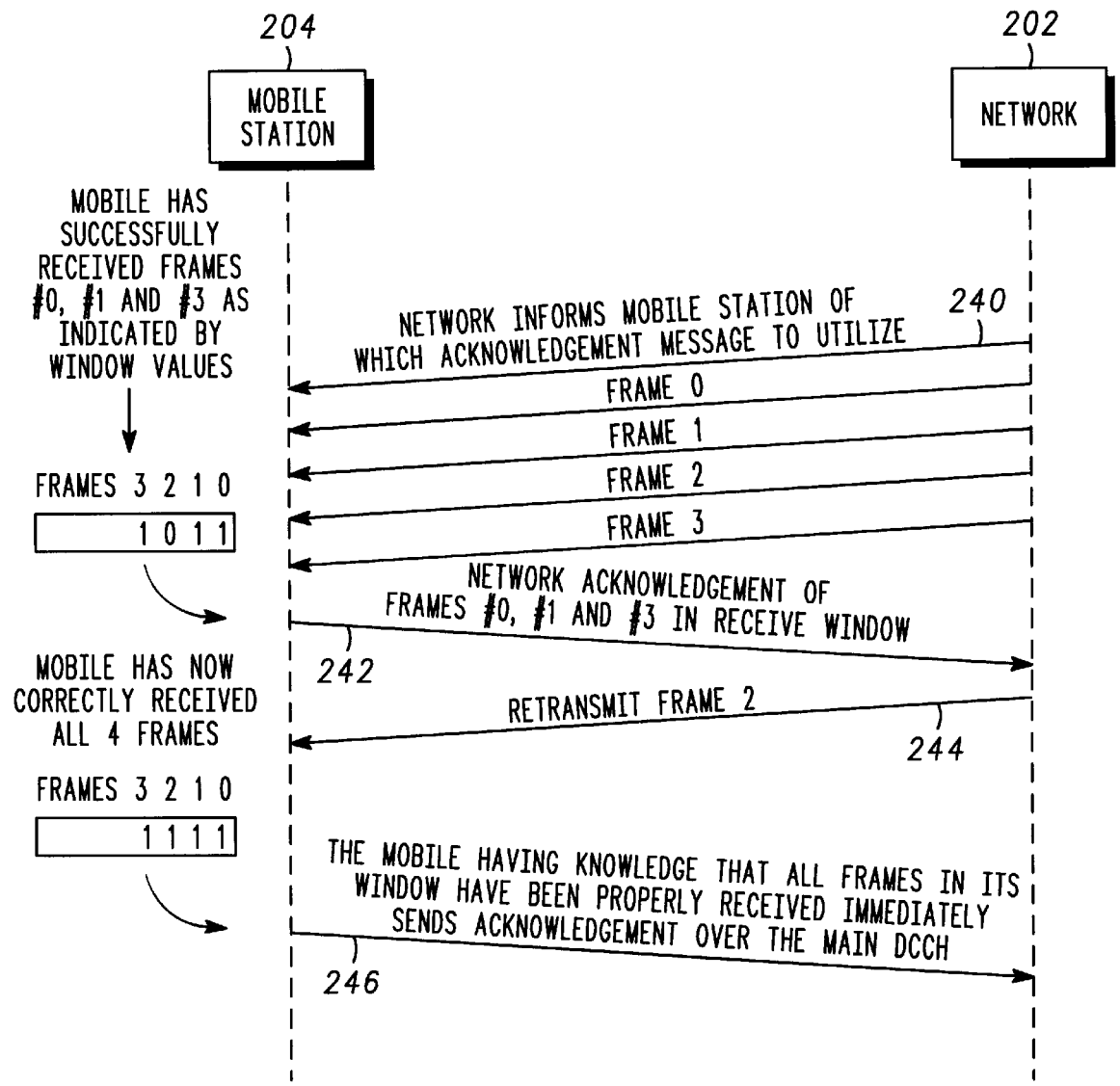
FIG. 3 is a data flow diagram of acknowledgement message interchange between a network and a mobile station, according to the present invention.

FIG. 3 is a data flow diagram of acknowledgement message interchange between a network and a mobile station, according to the present invention. According to the present invention, as illustrated in FIG. 3, the indication from acknowledgement coordination module 225 as to the desired mode for interchange of acknowledgement information is transmitted from network 202 to mobile station 204 in an acknowledgement exchange message 240. According to the present invention, acknowledgement exchange message 240 informs mobile station 204 to utilized either a temporary block flow or a main dedicated control channel for exchange of acknowledgement information.

In a preferred embodiment of the present invention, acknowledgement exchange message 240 is included in a request for acknowledgement information transmitted from network 202 to mobile station 204. For example, according to the present invention, acknowledgement exchange message 240 is included in the packet downlink assignment message of the known temporary block flow setup for transmission from network to mobile station 204. In this way, according to the present invention, acknowledgement exchange message 240 containing the indication of the mode for exchange of acknowledgement information interchange is transmitted along radio channel 206 from network 202 to mobile station 204 through a service access point identifier from service point identifiers SAPI 0–SAPI n, main dedicated control channels 232 and 220, logical to physical channel mapping units 236 and 222, medium access controllers 228 and 222, and physical layer interfaces 230 and 208, and is received by acknowledgement coordination module 219 of application interface 218.

According to the present invention, if the acknowledgement coordination module 219 determines that the desired mode indicated by acknowledgement exchange message 240 is the temporary block flow, or if no desired mode for exchange of acknowledgement information is indicated, acknowledgement information is transmitted from mobile station 204 to network 202 through packet data convergence protocol units 216 and 226, radio link controllers 214 and 232, medium access controllers 210 and 228, and physical layer interfaces 208 and 230, using the known temporary block flow setup for acknowledgement transmission by mobile station 204.

However, as illustrated in FIGS. 2 and 3, if acknowledgement coordination module 219 determines that the desired mode indicated by acknowledgement exchange message 240 is the main dedicated control channel, acknowledgement information is transmitted in an acknowledgement message 242 from mobile station 204 to network 202 through a defined service access point identifier of SAPI 0–SAPI 1 defined for acknowledgement exchange, main dedicated control channels 232 and 220, logical to physical channel mapping units 236 and 222, medium access controllers 228 and 222, and physical layer interfaces 230 and 208. For example, as illustrated in FIG. 3, acknowledgement message 242 indicates that frames zero, one and three were successfully received. Network 202 responds to acknowledgement message 242 by re-transmitting data frames 244, if any, that were not received by mobile station 204 until an acknowledgement message 246 indicating receipt of all frames has been received from mobile station 204.

Figure 4:
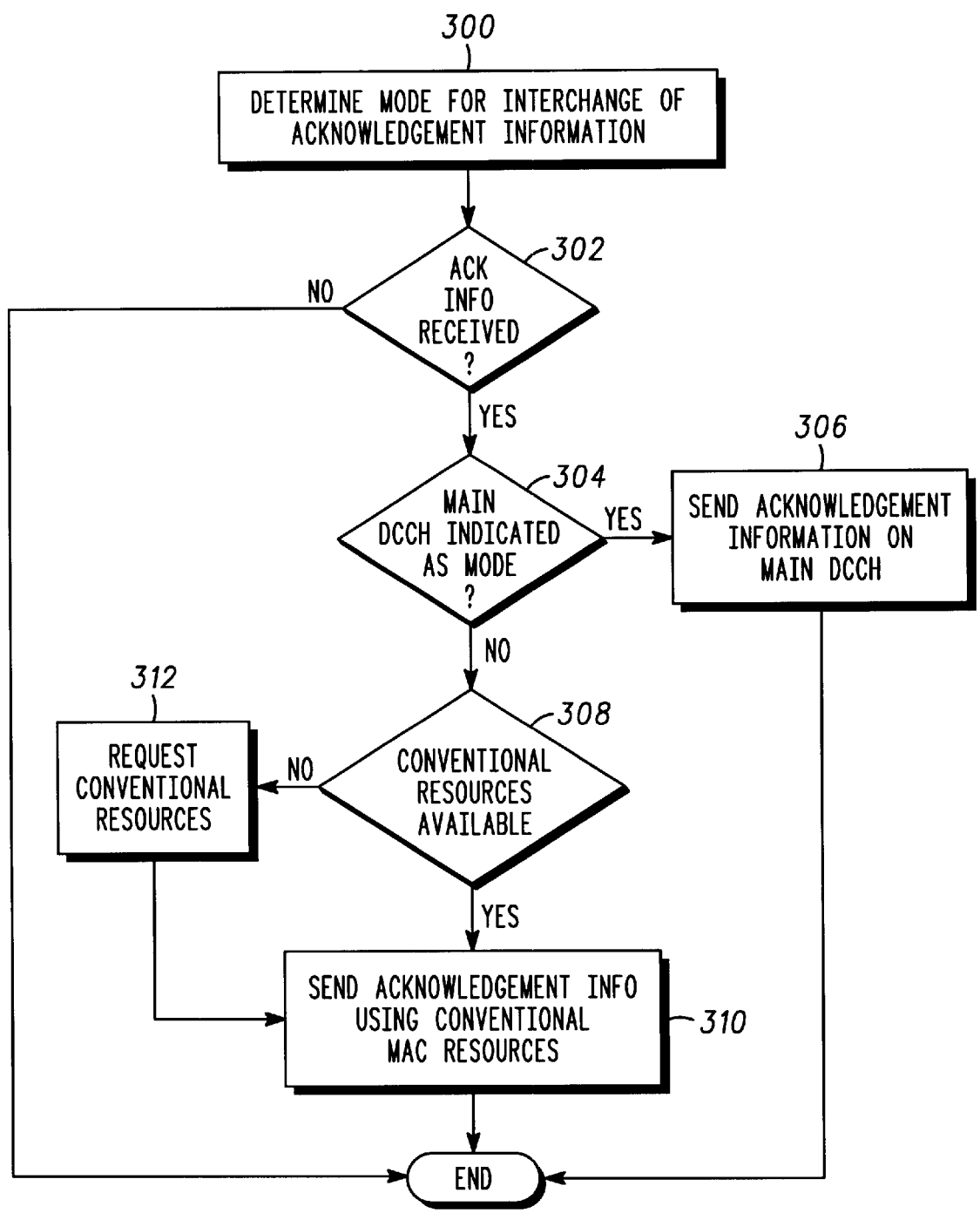
FIG. 4 is a flowchart of interchange of an acknowledgement message between a network and a user application, according to the present invention.

FIG. 4 is a flowchart of interchange of an acknowledgement message between a network and a user application, according to the present invention. As illustrated in FIGS. 2 and 4, network 100 initially determines whether to utilize the conventional temporary block flow or the main dedicated control channel as the mode for interchange of acknowledgement information, and transmits the determined mode to mobile station 204 in Step 300. When acknowledgement coordination module 219 of mobile station 104 determines that acknowledgement information has been received, Step 302, a determination is made as to whether the main dedicated control channel is the mode indicated for interchange of acknowledgement information, Step 304. If the main dedicated control channel is the mode indicated for interchange of acknowledgement information, mobile station 204 sends acknowledgement information, including an indication of frames received, on main dedicated control channel 220 using the defined special SAPI, Step 306. However, if the main dedicated control channel is not the mode indicated for interchange of acknowledgement information, a determination is made as to whether conventional resources, i.e., for a temporary block flow setup, are available, Step 308. If conventional resources are available, the acknowledgement information is transmitted by mobile station 204 using conventional medium access resources, Step 310. If conventional resources are not available, mobile station 204 requests the conventional resources, Step 312, and the acknowledgement information is then transmitted by mobile station using conventional medium access resources, Step 310.

While a particular embodiment of the present invention has been shown and described, modifications may be made. For example, although four frames are shown in FIG. 3 for purposes of simplification of the description, it is understood that actual implementations are likely to have window sizes much larger than four frames. It is therefore intended in the appended claims to cover all such changes and modifications that fall within the true spirit and scope of the invention.

What is claimed is:

1. A communication system, including a radiotelephone device transmitting acknowledgement information to a network, comprising:

a first acknowledgement coordination module, positioned within the network, transmitting an acknowledgement exchange message to the radiotelephone device indicating a mode for exchange of the acknowledgement information; and a second acknowledgement coordination module, positioned within the radiotelephone device, transmitting the acknowledgement information to the network using the indicated mode, wherein the radiotelephone device transmits the acknowledgement information along a main dedicated control channel in response to the indicated mode being the main dedicated control channel, wherein the radiotelephone device transmits the acknowledgement information to the network using a temporary block flow acknowledgement interchange in response to at least one of the mode being other than the main dedicated control channel and the mode not being received, wherein the network determines the mode for exchange of the acknowledgement information based on resource availability of the network, and wherein the main dedicated control channel includes a defined service access point identifier corresponding to the acknowledgement information for transmission of the acknowledgement information through the main dedicated control channel.

2. The communication system of claim 1, wherein the network determines the mode for exchange of the acknowledgement information based on resource availability of the network.

3. The communication system of claim 1, wherein the network determines the mode for exchange of the acknowledgement information based on resource availability of the network and network congestion.

4. The communication system of claim 2, wherein the radiotelephone device includes an application interface transferring network protocol information to a corresponding application within the radiotelephone device, and wherein the second acknowledgement coordination module is positioned within the application interface.

5. The communication system of claim 4, wherein the network includes a transport layer interface transferring the network protocol information to the radiotelephone device, and wherein the first acknowledgement coordination module is positioned within the transport layer interface.

6. The communication system of claim 5, wherein the acknowledgement exchange message is included in a request for acknowledgement information transmitted from the network to the radiotelephone device.

7. The communication system of claim 6, wherein the acknowledgement exchange message is included in a packet downlink assignment message of a temporary block flow setup corresponding to the request for acknowledgement information transmitted from the network to the radiotelephone device.

8. A radiotelephone device receiving network information transmitted from a network along a radio channel, comprising:

an acknowledgement coordination module determining a mode for exchange of acknowledgement information with the network; and a main dedicated control channel for transmitting signaling information to the network, wherein the radiotelephone device transmits the acknowledgement information to the network through the main dedicated control channel in response to the mode for exchange of acknowledgement information being the main dedicated control channel, wherein the acknowledgement information is transmitted to the network using a temporary block flow acknowledgement interchange in response to at least one of the mode being other than the main dedicated control channel and the mode not being received, and wherein the main dedicated control channel includes a defined service access point identifier corresponding to the acknowledgement information for transmission of the acknowledgement information through the main dedicated control channel.

9. The radiotelephone device of claim 8, wherein the network determines the mode for exchange of the acknowledgement information based on resource availability of the network and network congestion.

10. The radiotelephone device of claim 8, further comprising an application interface transferring network protocol information from the network to a corresponding application within the radiotelephone device, wherein the acknowledgement coordination module is positioned within the application interface.

11. The radio telephone device of claim 8, wherein the network is a GPRS/EDGE radio access network.

12. A method for exchange of acknowledgment information between a network and a user application, comprising the steps of:

attempting receive an acknowledgement exchange message including a mode for an exchange of acknowledgement information from the network; and transmitting the acknowledgement information to the network along a main dedicated control channel using a service access point identifier in response to the mode being the main dedicated control channel.

13. The method of claim 12, further comprising determining the mode for exchange of the acknowledgement information based on resource availability of the network.

14. The method of claim 12, further comprising determining the mode for exchange of the acknowledgement information based on network congestion.

15. The method of claim 12, further comprising determining the mode for exchange of the acknowledgement information in an application interface that transfers network protocol information to a corresponding application.

16. The method of claim 12, wherein the acknowledgement exchange message is included in a request for acknowledgement information transmitted from the network to a radiotelephone device including the user application.

17. The method of claim 12, wherein the acknowledgement exchange message is included in a packet downlink assignment message of a temporary block flow setup corresponding to a request for acknowledgement information transmitted from the network to a radiotelephone device including the user application.

* * * * *